(12) United States Patent
Maier et al.

(10) Patent No.: US 7,743,746 B2
(45) Date of Patent: Jun. 29, 2010

(54) COATING FOR CONNECTING RODS AND BEARINGS IN AN INTERNAL COMBUSTION ENGINE

(75) Inventors: Kurt Maier, Leonberg (DE); Reinhard Rose, Fellbach/Schmiden (DE)

(73) Assignee: Mahle International GmbH, Stuttgart (DE)

( * ) Notice: Subject to any disclaimer, the term of this patent is extended or adjusted under 35 U.S.C. 154(b) by 108 days.

(21) Appl. No.: 11/792,837

(22) PCT Filed: Dec. 9, 2005

(86) PCT No.: PCT/DE2005/002228
§ 371 (c)(1),
(2), (4) Date: Dec. 10, 2007

(87) PCT Pub. No.: WO2006/061012
PCT Pub. Date: Jun. 15, 2006

(65) Prior Publication Data
US 2008/0283021 A1 Nov. 20, 2008

(30) Foreign Application Priority Data
Dec. 10, 2004 (DE) ....................... 10 2004 059 490
Nov. 17, 2005 (DE) ....................... 10 2005 055 366

(51) Int. Cl.
*F02B 75/32* (2006.01)
(52) U.S. Cl. ................. 123/197.4; 123/197.3; 74/579 R
(58) Field of Classification Search .............. 123/197.3, 123/197.4; 74/579 R, 579 E
See application file for complete search history.

(56) References Cited

U.S. PATENT DOCUMENTS

| | | | |
|---|---|---|---|
| 3,120,346 A | 2/1964 | Willhoite | |
| 5,171,622 A | 12/1992 | Wegner | |
| 6,025,081 A | 2/2000 | Ohshiro et al. | |
| 6,560,869 B1 | 5/2003 | Schlegel et al. | |
| 2003/0134141 A1 | 7/2003 | Okado et al. | |
| 2005/0034559 A1 | 2/2005 | Lindenau et al. | |

FOREIGN PATENT DOCUMENTS

| | | |
|---|---|---|
| DE | 39 39 704 A1 | 6/1991 |
| DE | 197 31 625 A1 | 9/1998 |

(Continued)

OTHER PUBLICATIONS

International Search Report.

*Primary Examiner*—Noah Kamen
(74) *Attorney, Agent, or Firm*—Collard & Roe, P.C.

(57) ABSTRACT

Disclosed is a connecting rod for a combustion engine, comprising a small connecting-rod eye that is provided with a plain bearing surface and is used for accommodating a piston pin, and a large connecting-rod eye which is provided with a plain bearing surface and embraces a crankshaft journal. In order to very effectively and inexpensively prevent the piston pin and the crankshaft journal of the connecting rod from jamming and wearing off, a self-lubricating coating made of a thermally cured resin which contains embedded solid lubricant particles is applied directly to at least one of the plain bearing surfaces by means of rotary atomization.

5 Claims, 2 Drawing Sheets

FOREIGN PATENT DOCUMENTS

| | | |
|---|---|---|
| DE | 101 29 559 C1 | 11/2002 |
| DE | 102 03 285 C1 | 8/2003 |
| DE | 10 2004 018921 A1 | 11/2005 |
| EP | 0 863 322 B1 | 9/1998 |
| EP | 0 984 182 A1 | 3/2000 |
| JP | 04-282013 A | 10/1992 |
| JP | 06185615 A * | 7/1994 |
| JP | 07-110025 A | 4/1995 |
| JP | 2006336674 A * | 12/2006 |

* cited by examiner

COATING FOR CONNECTING RODS AND BEARINGS IN AN INTERNAL COMBUSTION ENGINE

BACKGROUND OF THE INVENTION

CROSS REFERENCE TO RELATED APPLICATIONS

Applicant claims priority under 35 U.S.C. §119 of German Application No. 10 2004 059 490.2 filed Dec. 10, 2004, and German Application No. 10 2005 055 366.4 filed Nov. 17, 2005. Applicant also claims priority under 35 U.S.C. §365 of PCT/DE2005/002228 filed Dec. 9, 2005. The international application under PCT article 21(2) was not published in English.

The invention relates to a connecting rod for an internal combustion engine, having a small connecting rod end provided with a slide bearing surface, for accommodating a piston pin, and a large connecting rod end provided with a slide bearing surface, which surrounds a crank journal, as well as a method for coating them.

Connecting rods having a direct coating of a connecting rod end are known in the prior art, for example from DE 197 31 625 as well as EP 0 863 322 B1. It is disclosed that for a connecting rod bearing, assembly is to be simplified in that the connecting rod bearing shells are eliminated. For this purpose, a bearing layer of metal, particularly of aluminum bronze, is directly applied to the large connecting rod end by means of plasma spraying; this layer is supposed to assure sufficient lubrication of the bearing points. In order to adhere to the dimensional accuracy for assembly of the connecting rod, as well as the surface quality of the coating, however, mechanical finishing, for example by means of honing or precision spindling of the metal layer generally continues to be necessary, and this does not permit a clear reduction in the production effort for such connecting rods. In practice, it has furthermore been shown that the metal layers cannot assure sufficient protection against seizing and reliable lubrication, because of the wear in the bearings, so that the useful lifetime of the connecting rod bearings in such embodiments is limited.

A powder mixture capable of being sintered, consisting of an aluminum base powder and/or its alloys or of a group of metals, such as copper, tin, lithium, or manganese, is known from DE 102 032 850 C1, which is subsequently post-compacted and sintered, whereby a sinter layer can also be applied to a component consisting of steel or cast material. However, an improvement in the slide properties is not achieved in this manner, only a weight reduction of the component.

Likewise, connecting rods without liners are known, for example from DE 101 29 559 C1, which have a direct coating of lead bronze on the small connecting rod end as a slide layer. Here, however, there are the disadvantages indicated above, since here, too, a metal layer is used as the slide layer. Finishing of the coating furthermore requires a great effort in terms of dimensional accuracy, in order to guarantee assembly even with the closest play of connecting rod and piston pin, which permits minimal noise development.

In order to improve the friction property, i.e. slide property of a component, a layer material is known from DE 39 39 704 A1, which material is supposed to produce an irregular, spot-like distribution of varying thickness on the component surface after having been sprayed on. In this connection, the regions having increased thickness are preferably formed by filler particles that are mixed into the layer material. However, it is a disadvantage in this connection that an uncontrolled, non-uniform layer thickness reduction is produced by a firing process for drying, and therefore a precise bearing play adjustment, for example of slide bearings, liners, or connecting rods of an internal combustion engine is not guaranteed.

SUMMARY OF THE INVENTION

It is therefore the task of the invention to indicate a slide component, particularly a connecting rod, for an internal combustion engine and a method for coating its slide bearing surfaces with which long-term protection against seizing and wear can be achieved, even with very close assembly play, in highly effective and cost-advantageous manner.

According to the invention, this task is accomplished by a connecting rod free of bearing shells for an internal combustion engine, having a small connecting rod end provided with a slide bearing surface, for accommodating a piston pin, and a large connecting rod end provided with a slide bearing surface, which surrounds a crank journal. At least one of the slide bearing surfaces has a self-lubricating coating of a resin that is hardened thermally, with solid lubricant particles embedded in it, directly connected with the connecting rod material.

By means of the direct application of a self-lubricating coating configured as a lubricating varnish, which consists of a resin that can be hardened thermally, with solid lubricant particles embedded in it, onto the slide bearing surfaces of the connecting rod ends of a connecting rod, essentially the following advantages are achieved:

No bearing liners are required, in order to achieve sufficient lubrication and resistance to seizing;

application of an adhesion layer to the slide bearing surfaces, in order to improve the adhesion of the lubricating varnish, is not necessary;

no finishing of the surface of the lubricating varnish that has been applied is required, in order to achieve a desired dimensional accuracy, such as the layer thickness of the coating, the closest possible layer thickness tolerance, the adjustment of the bearing play, etc., as well as the surface quality, such as roughness, waviness, etc.;

improved resistance is achieved as the result of improved lubricant properties, as compared with the known metal alloy layers, and thereby a greater useful lifetime of the connecting rod bearings is achieved.

Depending on the requirements, the embedded solid lubricant particles can consist of one or of a mixture of two of the materials graphite, molybdenum disulfide, tungsten disulfide, hexagonal boron nitride, or PTFE, in each instance, whereby the hardened coating of the slide bearing surface contains 50 to 60 wt.-% of the solid lubricant particles, in order to guarantee optimal lubrication of the connecting rod bearings. For this purpose, the solid lubricant particles have a particle size of 1 to 3 $\mu$m at a layer thickness of the hardened lubricating varnish of 10-15 $\mu$m. In this connection, the layer thickness tolerance is max. plus/minus 1 $\mu$m, making it possible to achieve the closest assembly play.

In terms of method, the lubricating varnish is advantageously applied to the slide bearing surfaces of the connecting rod ends by means of a rotation atomization method, thereby making it possible to achieve a coating of connecting rod ends even if they have a smaller diameter.

The layers produced in this manner, as indicated above, have an approximately constant layer thickness and a very good surface quality. Likewise, the depth of the region to be coated can be defined very well. The coating method is very economical as compared with the usual types of coatings.

Advantageous further developments are evident from the dependent claims.

BRIEF DESCRIPTION OF THE DRAWINGS

Exemplary embodiments of the invention will be described in greater detail below, using the attached drawings. These show.

DETAILED DESCRIPTION OF THE EMBODIMENTS

Figure 1:
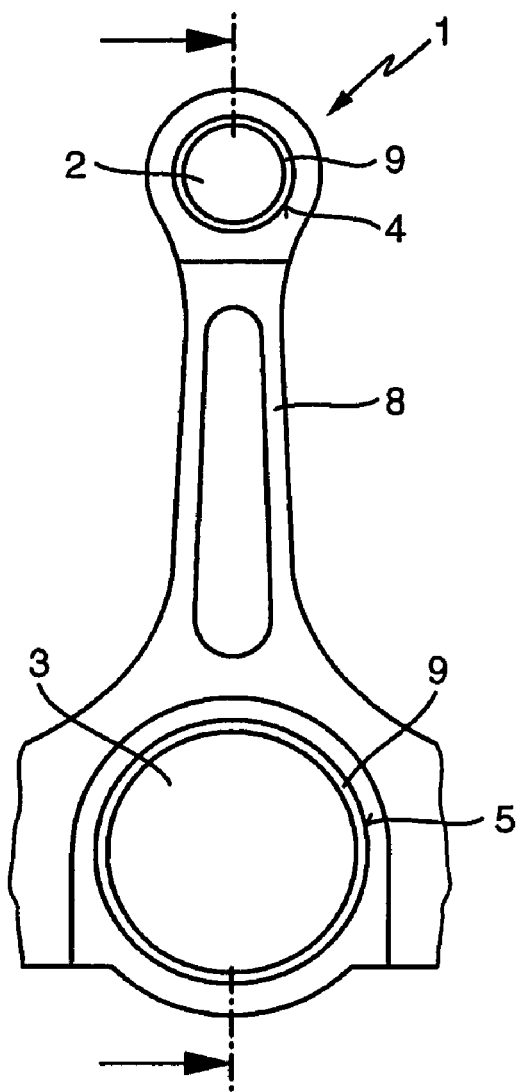
FIG. 1 a front view of a connecting rod coated according to the invention.
Figure 2:
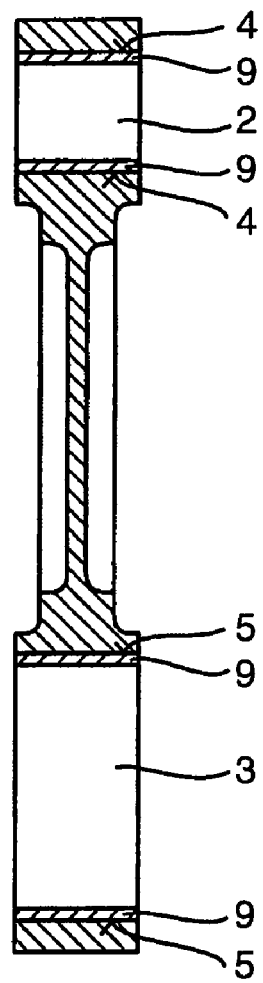
FIG. 2 a section along the line I-I according to FIG. 1.

The connecting rod 1 shown as an example according to FIG. 1, made of steel, has a small connecting rod end 2 having a slide bearing surface 4, a connecting rod shaft 8, and a large connecting rod end 3 having a slide bearing surface 5. The slide bearing surfaces 4 and 5 show a self-lubricating coating 9 that is formed from a resin that is hardened thermally, with the solid lubricant particles embedded in it—referred to as a lubricating varnish. The resin is a polyamide imide and the solid lubricant particles consists of one or a mixture of two of the materials graphite, molybdenum disulfide, tungsten disulfide, hexagonal boron nitride, or PTFE, in each instance.

A device 10 for rotation atomization serves to apply the coating according to the invention to the slide bearing surfaces 4 and 5 of the connecting rod ends. The device 10 has a basic body 11 that makes a transition into a nozzle body 13 that can rotate, which is provided with a bearing 12, a nozzle 14, as well as a nozzle exit 15. A drive 23 serves to rotate the nozzle body 13. The basic body 11 possesses feed channels 17 and 18, in each instance, which are intended for the lubricating varnish and for compressed air, and end in a mixing chamber 19 for metering and mixing. An ejection channel 20 connected with the mixing chamber 19 leads vertically to a baffle plate 16, which is disposed at a distance from the nozzle body 13, in order to produce a ring-shaped gap 22 having a width of 0.5 mm for ejection of the lubricating varnish spray jet 24.

The nozzle body 13 with its nozzle 14 rotates, by means of the drive 23, in the rpm range of 14,000 to 18,000 rotations per minute, so that the lubricating varnish/compressed air mixture is accelerated by the centrifugal forces that occur at the exit opening of the ring-shaped gap, and exits radially as a disk-shaped spray jet 24. In this connection, the nozzle diameter D is selected in such a manner that it approximately corresponds to half the diameter of the connecting rod end to be coated.

The device can be moved into the connecting rod end to be coated, up to the nozzle depth T. Since the spray jet is narrow in the axis direction, the surface to be coated can be sharply delimited, in the axis direction, by means of simply opening and closing the varnish feed. The nozzle diameters are available in the range between 5 and 25 mm, with nozzle depths up to 50 mm, so that large and small connecting rod ends of connecting rods for almost all engine types can be coated with the device.

EXEMPLARY EMBODIMENT 1

Coating in the small connecting rod end:

The connecting rod 1 is mechanically finished in known manner. The small connecting rod end 2 is precision-bored to a roughness Rz (average roughness depth) <6.3 µm. In this connection, the bore diameter before coating is selected in such a manner that the piston pin is given a diametral play of 30-40 µm. The small connecting rod end can be given a spherical mold bore. Afterwards, the connecting rod is cleaned in such a manner that chips, particles, machining oils, and the like are completely removed.

In order to prepare the coating, cover templates 21 are affixed on both sides of the connecting rod end, which templates are adapted to the outside contour of the small connecting rod end. The templates 21 prevent coating the outsides of the connecting rod.

The lubricating varnish, which is composed of the base resin polyamide imide, which is very temperature-resistant, contains a mixture of molybdenum sulfide and graphite having a particle size of 1-3 µm as the solid lubricant. The viscosity of the lubricating varnish is adjusted in such a manner that no drop formation is possible, but sufficient application is possible.

The nozzle is introduced into the connecting rod end in centered manner, at an advance of 10-20 mm/sec, so that the lubricating varnish is applied to the connecting rod, which has been preheated to 50 to 80° C. The lubricating varnish contains 50-60 wt.-% solid lubricants in the hardened state. The nozzle is subsequently retracted without feeding in any varnish. The entire coating process takes place in less than five seconds.

Afterwards, the layer is thermally hardened in an oven, whereby the connecting rod must be held at a temperature of 200° C. for between 10 and 20 minutes. The layer obtained in this manner is approximately 10 µm thick, whereby a layer thickness tolerance of plus/minus 1 µm is achieved. Despite a thickness reduction of the slide layer as the result of shrinking of the layer, a close diametral pin play is achieved, which amounts to 10-20 µm.

The inner slide surface, in other words the pin side, of a bearing sually consisting of two halves of shells or bushings, which can be inserted into the connecting rod eyes of a connecting rod, can be produced in analogous manner.

EXEMPLARY EMBODIMENT 2

Coating in the small connecting rod end with lubricant oil bore:

The connecting rod is finished and cleaned essentially in accordance with Exemplary embodiment 1, except that the connecting rod end diameter is designed for a diametral piston pin play of 20-30 µm before coating.

In order to prepare the coating, cover templates 21 are affixed on both sides of the connecting rod end, which templates are adapted to the outside contour of the small connecting rod end. The templates 21 prevent coating the outsides of the connecting rod.

The lubricating varnish, which is composed of the base resin polyamide imide, which is very temperature-resistant, contains graphite having a particle size of 1-3 µm as the solid lubricant. The viscosity of the lubricating varnish is adjusted in such a manner that no drop formation is possible, but sufficient application is possible.

Figure 3:
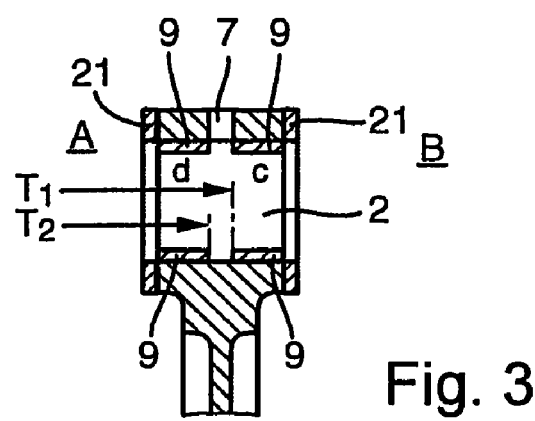
FIG. 3 another exemplary embodiment of a coated connecting rod according to FIG. 2.
Figure 4:
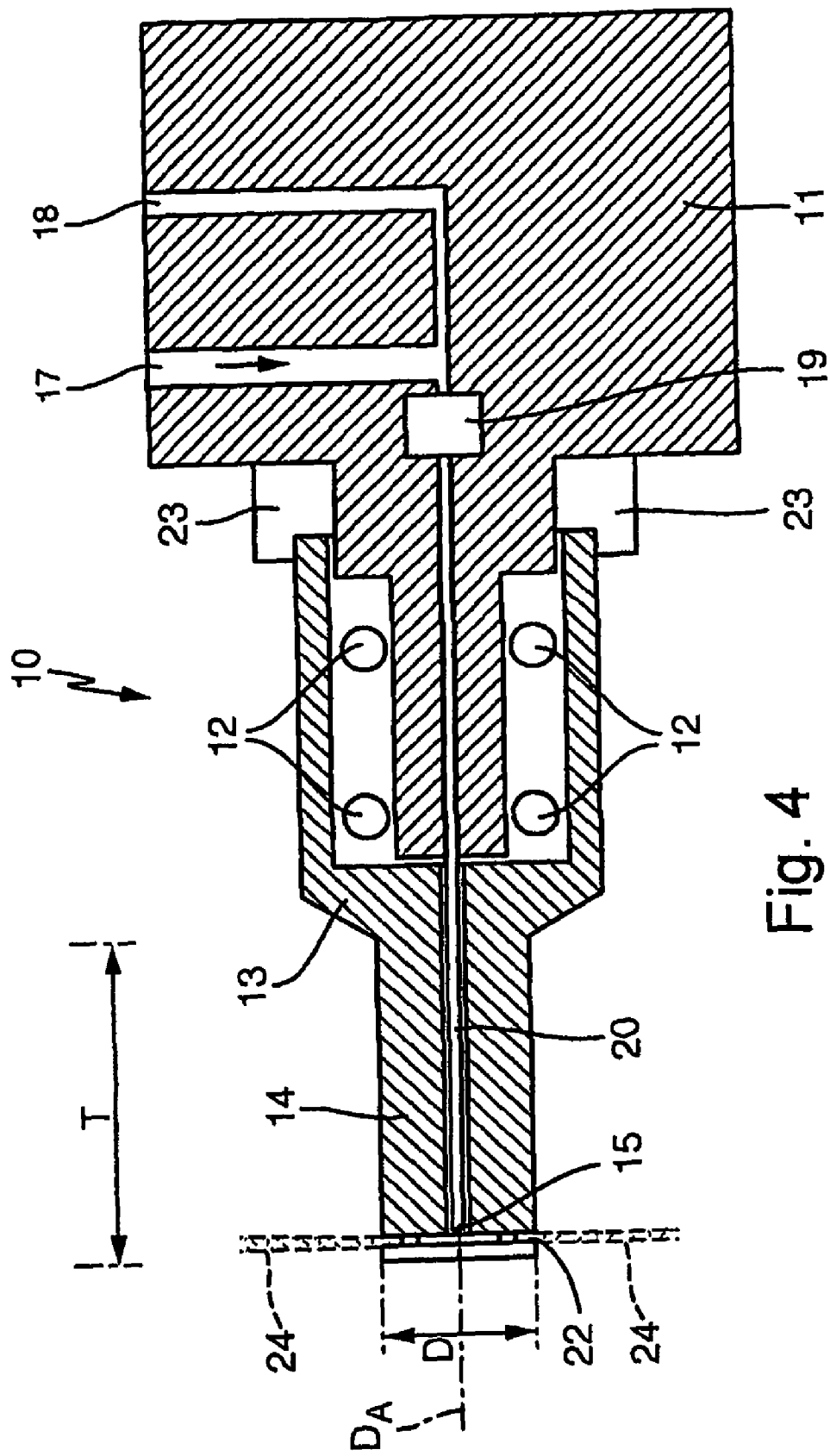
FIG. 4 a device for applying a coating to the slide bearing surfaces of a connecting rod.

The lubricant oil bore 7, which is affixed in the center of the small connecting rod end 2, is not supposed to be plugged up with the lubricant varnish. For this reason, and so that the lubricant oil can better distribute itself in the gap between connecting rod end and piston pin, the coating is left out in the region of the lubricant oil bore, in the form of a circumferential "lubricant groove" that runs radially, in accordance with the representation of FIG. 3. Likewise, one or more lubricant grooves that run parallel to the axis of the connecting rod ends, or also a combination thereof, can be implemented by means of the use of appropriate masks. The device 11 is used for coating.

The nozzle 14 is set against one connecting rod side (A) and moved in, without feeding in lubricating varnish, up to the depth T1 of the small connecting rod end 2. Subsequently, the lubricating varnish is applied in the region (C). In the region of the cover template 21, on the connecting rod side (B), the varnish feed is shut off, and the rest of the varnish remaining in the nozzle is sprayed onto the template. Subsequently, the nozzle 14 is moved back up to the depth T2, without feeding varnish, and from there the region (D) is sprayed with lubricant varnish. The remainder of the lubricating varnish is sprayed onto the connecting rod side A, in the region of the cover template 21. Application of the lubricating varnish takes place onto the connecting rod that has been preheated to 50 to 80° C.

Afterwards, the layer is thermally hardened in an oven, whereby the connecting rod must be held at a temperature of 200° C. for between 10 and 20 minutes. The layer obtained in this manner is approximately 10 μm thick, whereby a layer thickness tolerance of plus/minus 1 μm is achieved. Despite a thickness reduction of the slide layer as the result of shrinking of the layer, a close diametral pin play is achieved, which amounts to 10-20 μm. This play is particularly advantageous for avoiding noise caused by pin ticks. The coating guarantees that no seizing takes place despite the close play. Furthermore, the coating permits embedding of the smallest possible hard particles, which can get into the gap between connecting rod bore and piston pin.

The inner slide surface, in other words the pin side, of a bearing sually consisting of two halves of shells or bushings, which can be inserted into the connecting rod eyes of a connecting rod, can be produced in analogous manner.

EXEMPLARY EMBODIMENT 3

Coating in the small connecting rod end of a phosphatized connecting rod:

The connecting rod is finished and cleaned essentially in accordance with Exemplary embodiment 1, except that the connecting rod end diameter is designed for a diametral piston pin play of 20-30 μm before coating.

Afterwards, the upper half of the connecting rod 1 is phosphatized. A commercially available phosphatizing bath, namely Gardobond G 4098 from the Chemetall company in Frankfurt, is used as the phosphatizing solution. This phosphatizing process produces a layer having a thickness of approximately 5 μm, consisting of iron-manganese-phosphate. The layer serves, on the one hand, as an adhesion base for the varnish, and on the other hand, it has good lubricating and parting properties, and thereby serves, together with the lubricating varnish coating, to prevent seizing of the pin in the small connecting rod end.

In order to phosphatize the upper half of the connecting rod, the connecting rod is dipped into the solution only halfway, using a suitable rack.

Coating with lubricating varnish and hardening take place in accordance with Exemplary embodiment 1. The layer thickness of the lubricating varnish is also 10 μm, at a max. layer thickness tolerance of plus/minus 1 μm. With this, the diametral pin play (after coating) amounts to 0.1-10 μm. Despite the close play, the connecting rod/pin pairing is effectively protected against seizing by means of the double coating.

A centrifuge apparatus S-520 from the Sprimag company in Kirchheim is also suitable for carrying out the coating method.

It lies within the scope of the invention that the coating can also be used for connecting rods having connecting rod liners, or for bearing shells. The large connecting rod end can also be coated in the manner indicated.

REFERENCE SYMBOLS 1 connecting rod
2 small connecting rod end
3 large connecting rod end
4 slide bearing surface for small connecting rod end
5 slide bearing surface for large connecting rod end
6 coating
7 lubricant oil bore
8 connecting rod shaft
9 coating, self-lubricating (lubricating varnish)
10 device for rotation atomization
11 basic body
12 bearing for nozzle body
13 nozzle body
14 nozzle
15 nozzle exit
16 baffle plate
17 feed channel for lubricating varnish
18 feed channel for compressed air
19 mixing chamber
20 ejection channel
21 template
22 gap
23 drive
24 spray jet
D nozzle diameter
T nozzle depth
Da nozzle axis

The invention claimed is:

1. A connecting rod free of bearing shells for an internal combustion engine, having a small connecting rod end provided with a slide bearing surface, for accommodating a piston pin, and a large connecting rod end provided with a slide bearing surface, which surrounds a crank journal, wherein at least one of the slide bearing surfaces has a substantially permanent self-lubricating coating of a resin that is hardened thermally, with solid lubricant particles embedded in it, directly connected with the connecting rod material, wherein the resin is a polyamide imide, and wherein the solid lubricant particles consist of one or of a mixture of two of the materials graphite, molybdenum disulfide, tungsten disulfide, hexagonal boron nitride, or PTFE, in each instance, wherein the coating of the slide bearing surface contains 50 to 60 wt.-% of the solid lubricant particles, and wherein the solid lubricant particles have a particle size of 1 to 3 μm.

2. Connecting rod free of bearing shells according to claim 1, wherein the layer thickness of the coating amounts to 10-15 μm.

3. Connecting rod free of bearing shells according to claim 2, wherein the layer thickness amounts to a tolerance of +/−1 μm.

4. Connecting rod free of bearing shells according to claim 1, wherein the slide surface of the small connecting rod end is coated.

5. Use of a coating that is formed from a thermally hardened resin having embedded solid lubricant particles, substantially permanently and directly on at least one of the connecting rod ends of a connecting rod, a bearing shell of a slide bearing, or a bearing liner, as a slide bearing layer in an internal combustion engine, wherein the resin is a polyamide imide, and wherein the solid lubricant particles consist of one or of a mixture of two of the materials graphite, molybdenum disulfide, tungsten disulfide, hexagonal boron nitride, or PTFE, in each instance, wherein the coating of the slide bearing surface contains 50 to 60 wt.-% of the solid lubricant particles, and wherein the solid lubricant particles have a particle size of 1 to 3 μm.

* * * * *